United States Patent [11] 3,612,105

[72] Inventor Harold W. Martin
 18602 Beachmont Ave., Santa Ana, Calif. 92705
[21] Appl. No. 823,915
[22] Filed May 12, 1969
[45] Patented Oct. 12, 1971

[54] PRESSURE PEAK SUPPRESSORS
 6 Claims, 6 Drawing Figs.
[52] U.S. Cl. ................................................... 138/30
[51] Int. Cl. ................................................. F16l 55/04
[50] Field of Search ................................... 138/30, 28, 26

[56] References Cited
UNITED STATES PATENTS

| 315,453 | 4/1885 | Waddell | 138/30 |
|---|---|---|---|
| 3,149,645 | 9/1964 | Broadwell | 138/30 |
| 3,430,660 | 3/1969 | Mitton | 138/30 |
| 3,477,473 | 11/1969 | Henry-Biabaud | 138/30 |

Primary Examiner—Laverne D. Geiger
Assistant Examiner—Richard J. Sher
Attorney—Nienow & Frater ABSTRACT: This invention relates to pressure peak suppressors of the accumulator type for fluid pressure systems. The embodiment illustrated employs an elastomeric diaphragm in the form of a tube closed at one end by an integrally formed wall. The other end of the tube is covered by an end member to form a container for system fluid. Communication to the interior of the tube, or container, is afforded through an orifice in the end member. The diaphragm part of the container is arranged so that the incremental pressure required to deform it increases with the degree of its deformation. The end member is arranged so that less resistance is offered to flow out of the container. The diaphragm has uniform wall thickness over the length of its tubular section but the diameter of its central opening diminishes along its length. In the end member, the orifice increases in cross-sectional area in the direction from the interior to the exterior of the tube. The whole container is disposed within an outer housing or container.

3,612,105
FIG.1
FIG.2
FIG.6
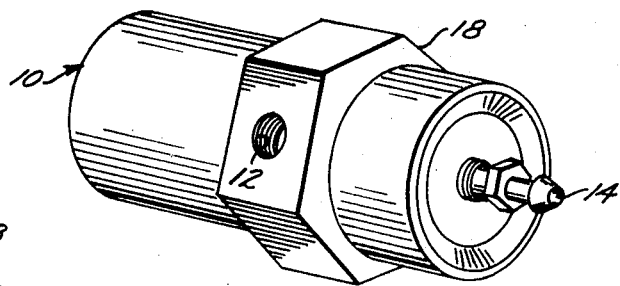
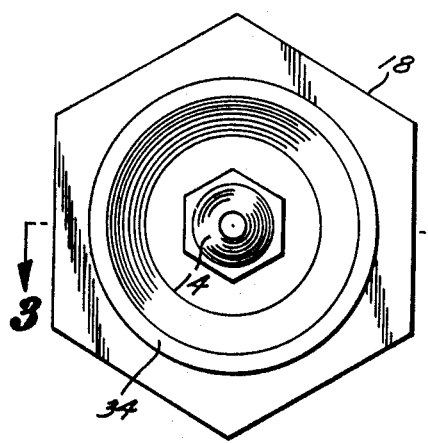
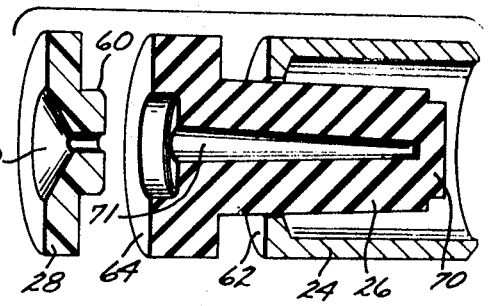
FIG.3
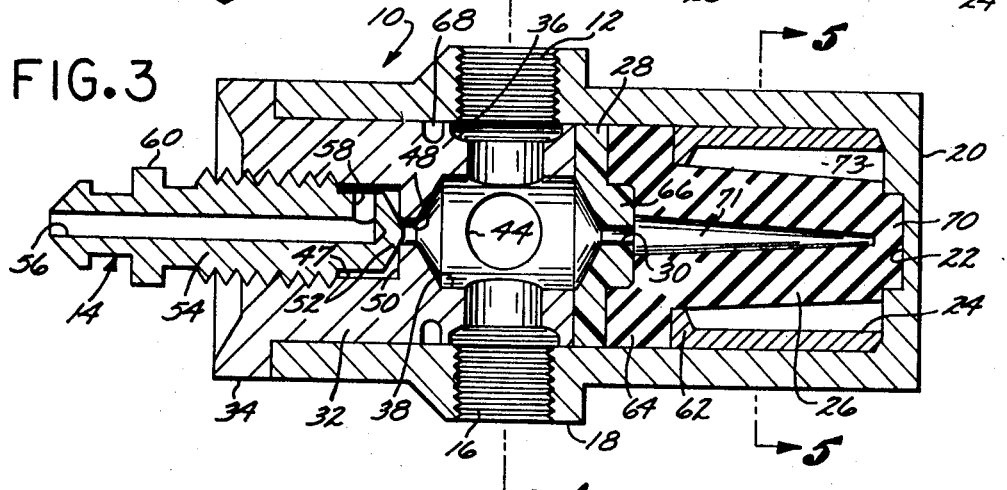
FIG.4
FIG.5
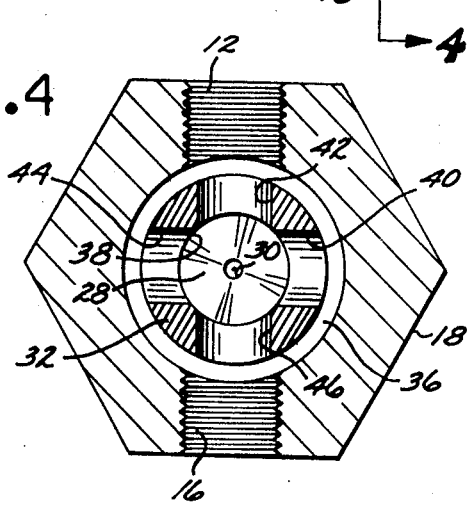
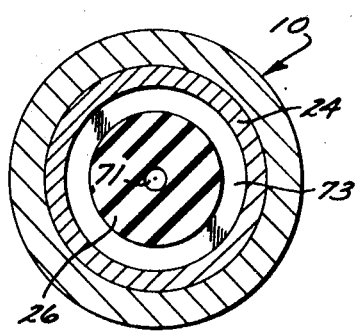
INVENTOR.
HAROLD W. MARTIN
BY
Nierow & Frater
ATTORNEYS

PRESSURE PEAK SUPPRESSORS

This invention relates to improvements in pressure peak suppressors for connection to pressurized fluid lines.

One object of the invention is to provide an improved accumulator for fluid systems, especially hydraulic systems. Another object is to provide a novel structure for suppressing rapid pressure changes in fluid systems. In particular it is an object to provide a pressure peak suppressor in the form of an accumulator which responds rapidly to absorb system pressure increases and to dissipate energy input shocks at a relatively slow rate through the remainder of the fluid system. In this connection it is the object of the invention to provide an accumulator the flow path to which offers a lower impedance to flow into the container than is offered to flow from the accumulator. Further it is an object of the invention to provide an accumulator in the form of an elastically deformable member the spring rate of which increases with the degree of deformation. An accumulator with these characteristics forms a pressure peak suppressor of a kind which is particularly useful in the hydraulic braking systems of automobiles in that it serves to prevent application to the other wheels of the system any pressure peaks or spikes introduced into the fluid line by reactionary forces at one of the wheels. An object is to provide an improved pressure peak suppressor for the use in automobile hydraulic braking systems and in this connection it is an object of the invention to provide a peak suppressor which can be mounted directly adjacent to the master cylinder of such a system and which may be made in a size and a form that can be incorporated in the same housing with the hydraulic master cylinder of such a system. Hydraulic positioning systems in which the output member is a movable piston, are often employed in the situations where substantial reactive forces are transmitted back into the fluid through the piston. Thus, for example, the hydraulic systems employed in earth moving equipment, in shovels and scrapers and diggers and in hammers and the like often experience very high input pressure peaks as a result of forces transmitted to their fluid through the output member. Pressure peak suppressors according to the invention are particularly useful to limit the pressure peaks applied to the remainder of the system through the hydraulic fluid in those applications. Another object of the invention is to provide an accumulator and pressure peak suppressor which is useful in such systems and helps curb the deleterious affect of high-pressure spikes and peaks.

The invention is not limited to use in pneumatic and hydraulic systems which accomplish position control. It is applicable to any pneumatic or hydraulic system in which high-pressure pulses are transmitted into the fluid of the system. The effect of such input pulses is to stress, possibly unduly, the elements and fittings of the system. In the case of a system which includes several output elements each of which is to be positioned, such for example as an automotive braking system, the result can be a position error manifested as a locked brake. Similarly, reaction to sharp input pressure pulses might be manifested as the "bucking" of an arm or element in an earth moving machine or the like.

The input reactionary forcing function is likely to be quite complex ranging from pressure spikes of short duration to slow ramp changes. Most often the input function can be expected to be broad banded including components over a wide range of frequencies. The energy in the low-frequency component can be expected to be substantially greater than the energy of the high-frequency components. In this connection it is an object of the invention to provide an accumulator and peak suppressor which will serve as a very broad band filter to smooth out pressure changes in fluid systems, principally in systems employing relatively incompressible fluids. These advantages are achieved in the invention, at least in part, by the provision of a peak suppressor which includes an elastic member made to deform as an incident to system pressure increase and the spring rate of which increases materially, although not abruptly, as the degree of deformation is increased. The flow path into and out of the accumulator is arranged so that a greater impedance is offered to flow in one direction than in the other direction. Application of these resistive and elastic forces introduces a time lag into system reaction to an input pressure change whereby an advantageous effect is realized whether the restriction is arranged to provide greatest resistance to flow into or out of the accumulator. However the greater advantage is proved when flow into the accumulator is relatively unrestricted and flow from the accumulator is restricted. This feature coupled with a spring rate in the accumulator which does not obey Hook's Law but in which spring rate increases with deformation, provides a very broad band filter or peak suppressor. These features of the invention may be combined with another. In preferred form the invention invisions an accumulator one element of which exerts an elastic opposition to pressure changes when deformed and which is enclosed in a fluid filled chamber such that the fluid in the chamber, which is itself elastic, is compressed as an incident to deformation of the elastic member.

In the embodiment selected for illustration the primary element of the accumulator is a container whose walls are made of an elastomeric material which is stretched when fluid flows into its interior as an incident to a pressure increase in the system external to the accumulator. That elastomeric container is disposed within the cavity of a sealed housing. The elastomeric container does not fill the cavity of the housing, the remaining volume being filled with air which may be pressurized in greater degree upon expansion of the elastomeric container. The effect of this construction is to place two accumulators in series. The second is formed to include the equivalent of a frictional impedance in that energy used to compress the air in the series accumulator is dissipated as heat. The quantity of energy that can be thus dissipated in a practical device is quite limited. Nonetheless, this feature of the invention becomes quite important in the case of high-amplitude input forces of short duration which are superimposed upon lower frequency components of longer duration. This situation corresponds to the system being jarred while under heavy load and it is useful in that circumstances to dissipate the energy in the high-frequency component rather than merely to delay the time when the system must react to it.

All of these objects and advantages are realized in the invention by the provision of a suppressor which is only connected to, and need not be in series with, the fluid system which it protects. Other objects and advantages of the invention will hereinafter appear upon examination of the following specifications in the accompanying drawing in which:

FIG. 1 is an isometric view of a pressure peak suppressor embodying the invention;

FIG. 2 is a top plan view of the unit of FIG. 1;

FIG. 3 is a cross-sectional view of the pressure peak suppressor taken on line 3—3 of FIG. 2;

FIG. 4 is a cross-sectional view taken through the flow distributor gland of the unit on line 4—4 of FIG. 3;

FIG. 5 is a cross-sectional view taken through unit on line 5—5 of FIG. 3; and

FIG. 6 is an exploded view showing in cross section the elements of the accumulator container and spacer.

The unit of FIG. 1 is arranged for use as an element of an hydraulic system. The housing 10 is provided with a pair of flow openings by which the housing is connected in series with a hydraulic line. One of those openings is visible in FIG. 1 where it is identified by the reference number 12. The accumulator or peak suppressor structure connects to the hydraulic line rather then being connected in series with it and is contained within the left end of the housing in FIG. 1. At the other end of housing 10, the right hand end FIG. 1, the unit is provided with a fluid line and valve structure 14 which also simply connects with the hydraulic line rather then being in series with it. This is illustrated in FIG. 3 where the unit is seen to have an opening 16 arranged diametrically across from the opening 12. The housing 10 is generally cylindrical except that it has hexagonal shape externally of the housing in the middistance along its length. The hexagonally shaped portion is designated by the reference numeral 18 in the drawings.

In FIG. 3 the accumulator or peak suppressor part of the unit is shown at the right of the flow path openings 12 and 16 and the bleed valve and line 14 is shown at the left. The several elements inside the housing 10 are assembled from its left end in FIG. 3. The right end of the housing is closed by an end wall 20 which is formed with a shallow recess 22 centrally in the interior face of the wall 20. The first element to be assembled in the housing is the spacer sleeve 24. Next to be assembled into the housing is the accumulator diaphragm 26. This diaphragm and the disc 28, which overlies the left end of the diaphragm 26, form a "container" for hydraulic fluid. The disc 28 serves as one end wall of the container and it is in this end wall that the flow opening affording communication to the interior of the container is formed. That opening 30 has a form of a orifice defined by the walls of the disc 28 surrounding the orifice opening.

Abutting the left face of the disc 28 is the right end of a gland 32. The gland is provided at its left end with a shoulder 34 which seats against the left rim or end of the housing 10. The gland extends past the openings 12 and 16 to the disc 28. That portion of the gland 32 which lies in the plane of the openings 12 and 16 has reduced outside diameter to form an annular flow path for fluid around the gland and between the two flow path openings 12 and 16. The peripheral wall around the gland in this region has been designated by the reference numeral 36 to facilitate its identification. The gland is provided with an axial bore or recess which is defined by the internal wall 38 and which opens to the right end of the gland. The diameter of that recess is approximately equal to the diameter of the orifice 30 at the left face of disc 28. Orifice 30 has a small uniform diameter at its side towards the interior of the diaphragm 26. But it widens at its side toward the spring gland so that its cross-sectional area becomes increasingly greater toward the left face of the disc. Conversely, the diameter of the orifice opening decreases in the direction toward the diaphragm 26.

Communication between the inner recess defined by wall 38 and the annular flow manifold around the gland defined by wall 36 is afforded through four holes bored through the gland at right angles to one another so that the axes of all of them lie in the same plane. This plane is nearly coincident with the plane containing the axes of openings 12 and 16. These openings are best seen in FIG. 4 where they are defined by walls 40, 42, 44, and 46 of the gland. The particular arrangement of this right end of the gland is not critical, it being important only that the structure by symmetrical and arranged to avoid unequal pressure drops between the orifice 30 and the two hydraulic flow path openings 12 and 16.

The gland 32 is provided with an axial, internally threaded bore 47 extending from its left end toward the recess formed by wall 38. This recess is connected to the recess formed by wall 38 by a smaller diameter connecting opening 48. Opening 48 having a smaller diameter, a shoulder 50 is formed at the right end of the threaded recess. That shoulder serves as a valve seat for a valve head formed by the conically shaped end 52 of the externally threaded shaft 54. The shaft is provided with a central bore 56 which opens at the left end of the shaft and is closed at the right end. A lateral connecting passage 58 affords communication from the recess 47 through the opening 56. The shaft 54 is rotated to open and close the bleed valve formed by seat 50 and head 52 to bleed air from the hydraulic system through the passageways 58 and 56. Rotation is facilitated by a hexagonally shaped section 60 of the valve shaft 54. Except when the hydraulic system is being serviced, the bleed valve remains closed.

Returning to the elements that form the accumulator and pressure peak suppressor, the sleeve 24 serves as a spacer and as a support to confine the diaphragm 26 against movement axially of the unit while permitting expansion of its sidewalls. To this end of the sleeve 24 away from end wall 20 is provided with an inwardly projecting shoulder portion 62 against which the outwardly extending flange portion 64 of the diaphragm is seated. The left face of the diaphragm 26 is recessed and boss 66 formed axially at the right face of the disc 28 is disposed in that recess. In the preferred embodiment shown, the sleeve 24 and flange 64 of diaphragm 26 have outer diameter so that they can be assembled with a sliding fit into the housing 10. The disc 28 has an outside diameter sufficiently great so that it must be forced or press-fitted into position against the flange 64 of the diaphragm. The gland 32 is encompassed by a sealing O-ring 68 to insure that the unit is sealed even if the gland or the inner wall of the housing are not perfectly cylindrical. The gland has outside diameter sufficiently great so that it too must be forced into position or press-fitted into position. In this embodiment, assembly is accomplished while gland is cooled and the housing is heated. To insure that the diaphragm is stable within the housing it is provided at the right end, in FIG. 3, with a projection having diameter to fit snugly within the recess 22. The projection is identified by the reference numeral 70. In this embodiment the diaphragm 26 is generally tubular in shape having an elongate central opening 71 which is symmetrical about the central axis of the diaphragm and of the entire unit and which tapers toward the closed right end of the diaphragm at the projection 70. Thus, the cross-sectional area of the central opening 71 in the diaphragm 26 is reduced at successive points along the opening away from the disc 28 and its orifice 30. The thickness of the sidewall of the diaphragm 26 is uniform over the length of the diaphragm from its flange end to its closed end at the projection 70. Thus the tubular element which forms the diaphragm 26 has the shape of a Thus cone.

The spacer 24 can be considered to comprise an element of the housing. The end of the spacer rests against the closed end wall 20 of the housing and at its other end the central opening of the sleeve is closed by the flange 64 of the diaphragm. Thus a cavity is formed within the housing and the diaphragm 26 is disposed within that cavity. The inner wall of the spacer sleeve 24 is spaced from the outer wall of the diaphragm 26. Thus an air space 73 is provided into which the wall of the diaphragm can expand. The air in that space is trapped and will be compressed when the diaphragm is expanded.

While the embodiment selected for illustration in the drawing incorporates specific novel features which contribute to the objects and advantages of the invention, this is but one of a variety of structural arrangements that may be employed. The invention contemplates incorporation of a container for fluid in its structure. That container must have variable internal volume. Such a container may have only one wall or only a portion of one wall that is movable. Thus it may comprise a cylinder and piston arrangement or a syphon bellows or a simple disc-shaped diaphragm or be otherwise arranged. In this embodiment the container comprises a combination of the tubular diaphragm structure 26 together with the disc 28. Certain portions of the diaphragm 26 serve only to anchor the element in fixed position. It is primarily the sidewall section of the diaphragm that surrounds the central tapered passageway and serves the function of a diaphragm in that it is movable to vary the internal volume of the container.

The invention contemplates that a change in the internal volume of the container, at least a change to increase its volume, by opposed by some elastic force. That force may be derived from an element external to the diaphragm such for example as a spring member. Alternatively, that force may comprise the remittance of the material of which the diaphragm is formed. In this embodiment the diaphragm is made of an elastomeric material, such for example, as natural rubber or some synthetic material. The embodiment selected for illustration is suitable for use in the hydraulic braking system of automobiles. Its diaphragm 26 is made of rubber of 70 Durometer hardness.

Means are provided for permitting flow into and out of the container and that means is arranged so that greater impedance to flow is presented in one flow direction than in the other. Advantageously less opposition is offered to flow into the container. A variety of structural forms are available to accomplish this function. When the differential in flow impedance is required to be great, part of the flow may be controlled by a one way valve system. In those instances when a relatively short time lag is sufficient, as in the case of an automotive system where the primary purpose is to smooth out large pressure spikes, the required differential in flow impedance is provided by arranging a structure so that flow is less turbulent in one direction than in the other. In the embodiment selected for illustration, the disc 28 is provided with an orifice 30 which is shaped so that the flow experiences less turbulence in the direction into the container than is experienced when it flows outwardly from the container. This is accomplished by tapering the orifice opening so that its diameter is increased at successive points along its length, or at successive cross-sectional places along its length, toward the side of the opening away from the interior of the container. At the interior of the container the opening 30 appears in a flat wall. That wall is arranged so that fluid within the container is propelled toward the entire wall when the diaphragm 26 contracts to reduce its internal volume. The result is that flow in the region of that wall, the right face of the disc 28, is turbulent and the fluid experiences more resistence in flowing out of the container than is experienced in flowing into it. In this embodiment the opening is simply conically shaped at the left. The surface can be curved at this point or otherwise shaped to reduce the impedance to flow into the direction into the container if desired.

In a preferred form of the invention the elastic opposition to increase in internal volume of the container increases with successive incremental increases in internal volume. This can be accomplished in a variety of ways, it being necessary only to insure that the spring rate of the elastic means increases with the degree of deformation of that member that supplies the elastic opposition. This is often done, for example, by using nested springs successive ones of which experience deformation only after others have been deformed in some given amount. In the preferred form of the invention the elastic opposition is provided by the renitence of the diaphragm material itself and it is accomplished by structuring the diaphragm so that the elastic opposition it exerts per unit of area force application differs in different areas of the diaphragm. This can be accomplished by varying the renitence of the diaphragm by using material of variable elasticity or by varying the thickness and by other structural arrangements. In the preferred embodiment illustrated, this is accomplished by using a diaphragm of uniform wall thickness, the wall defining a tubular structure in which the inner opening has smaller cross-sectional diameter at successive points along its length, or at successful cross-sectional planes along its length, so that the ratio of wall area to surface force application increases along the length of the container. This construction results in a diaphragm which resists expansion more at its right end where its internal opening is smaller then it does at the left end where the diameter of the inner opening is larger. When fluid is forced into the container under pressure the diaphragm tends to balloon at its end toward the flange 64 before there is corresponding stretching and expansion of the sidewalls of the diaphragm at its right end.

Advantageously the elastic means for opposing changes in the internal volume of the container includes a resistence to such change in which energy will be dissipated as heat as an incident to a change to increase the volume of that container. Many structural arrangements may be employed to accomplish this function. The arrangement selected for incorporation in the embodiments shown in the drawings contributes to the nonliniarity of the spring rate of that elastic means. The diaphragm is enclosed in a cavity which it does not fill. The remaining space is occupied by a compressible fluid such, for example, as compressed air. Expansion of the diaphragm further compresses that air and heats it. In this embodiment the space between the inner surface of the spacer 24 and the outer surface of the diaphragm 26 is filled with air which is compressed somewhat during assembly of the disc 28 diaphragm 26 and the sleeve 24 in the housing 10.

Although I have shown and described certain specific embodiments of my invention, I am fully aware that many modifications thereof are possible. My invention therefore is not to be restricted except insofar as is necessitated by the prior art and by the spirit of the appended claim.

I claim:

1. A pressure peak suppressor for connection to a pressurized fluid line, comprising:
   a container for fluid having variable internal volume;
   elastic means for elastically opposing changes in internal volume of the container; and
   a fluid flow path communicating with the interior of said container and offering greater impedance to the flow of fluid emerging from said container than to the flow of fluid into said container;
   said container being formed with a relatively inelastic end wall whereby the cross section area of said flow path remains unchanged in operation;
   said container comprising an elongate, closed tube having sidewalls of elastomeric material;
   the ratio of cross-sectional area of the sidewalls to the cross-sectional area of the interior tube opening defined by those sidewalls increases at successive planes along the length of said tube away from said end wall.

2. The invention defined in claim 1 in which the inner opening defined b said tube has reduced cross-sectional area in the direction away from said end wall, the thickness of said sidewalls remaining substantially uniform.

3. The invention defined in claim 2 which further comprises a housing formed of the cavity closed by an end wall; and which further comprises a sleeve fitted within the said cavity against said end wall of the housing, said sleeve having an annular inner surface and an inwardly extending flange at its end away from said end of the housing; said container comprising a conical tube formed with an outwardly extending flange at said end wall above the tube overlying said flange of the sleeve; said end wall of the tube comprising a disc overlying said flange of the tube and having a central openings tapering along its length to a larger diameter at its side away from said flanges.

4. The invention defined in claim 3 in which said end wall of the housing is provided with a recess in which an end of said tube is disposed, said housing being formed with passageways defining a fluid flow path communicating with said central opening of the disc.

5. A pressure peak suppressor for connection to a pressurized fluid line comprising:
   a container for fluid having variable internal volume;
   elastic means for elastically opposing changes in internal volume of the container; and
   a fluid flow path communicating with the interior of said container and offering greater impedance to the flow of fluid emerging from said container than to the flow of fluid into said container;
   said elastic means comprising a deformable member having a spring rate which increases with the degree of deformation;
   said deformable member comprising the sidewall of said container, said sidewall being formed symmetrically about a center axis such that the ratio of the cross-sectional area of the interior opening defined by said sidewalls increases at successive planes along the length of said sidewalls.

6. The invention defined in claim 5 in which said sidewall of the container are formed of elastomeric material of uniform wall thickness defining an interior opening deminishing in diameter at successive points along said central axis.